United States Patent [19] [11] 4,323,349
Maltzman et al. [45] Apr. 6, 1982

[54] TEACHING METHOD AND APPARATUS

[76] Inventors: Edward Maltzman, 35 Bellingham Rd., Chestnut Hill, Mass. 02167; Herman E. Erikson, 127 Ridge St., Winchester, Mass. 01890

[21] Appl. No.: 825,661

[22] Filed: Aug. 18, 1977

Related U.S. Application Data

[63] Continuation-in-part of Ser. No. 658,374, Feb. 17, 1976, abandoned.

[51] Int. Cl.³ .............................................. G09B 17/00
[52] U.S. Cl. ...................................... 434/184; 434/258
[58] Field of Search ....... 35/9 E, 9 F, 22 R, 26, 35 R, 35/35 B, 37; 434/184, 258

[56] References Cited

U.S. PATENT DOCUMENTS

| | | | |
|---|---|---|---|
| 1,509,371 | 9/1924 | Nalle | 35/22 R |
| 1,559,665 | 11/1925 | Beery et al. | 35/26 |
| 1,587,026 | 1/1926 | Nalle | 35/22 R |
| 2,169,266 | 8/1939 | Matter | 35/9 F |
| 3,162,959 | 12/1964 | Woolman | 35/9 E |
| 3,341,951 | 9/1967 | Barnette | 35/35 B |
| 3,570,145 | 3/1971 | Hickey | 35/35 R |
| 3,680,224 | 8/1972 | Hall | 35/9 E |
| 3,827,164 | 8/1974 | Hale | 35/37 |
| 3,906,644 | 9/1975 | Levinson et al. | 35/35 R |

Primary Examiner—William H. Grieb

[57] ABSTRACT

This invention is directed to a novel teaching apparatus for exposing and fading visual stimuli, e.g., shapes, letters, symbols and the like, and to novel methods for teaching and/or reinforcing the perpetual-motor learning process.

19 Claims, 10 Drawing Figures

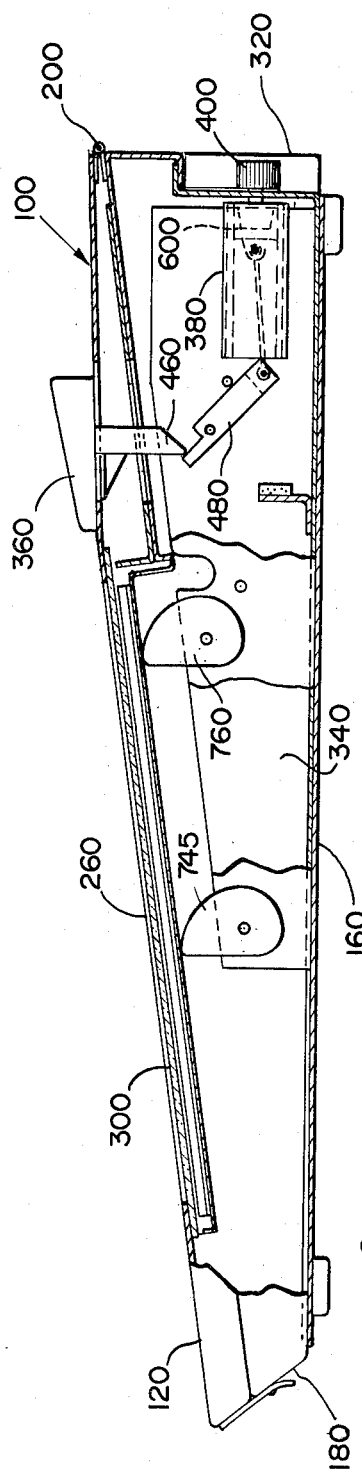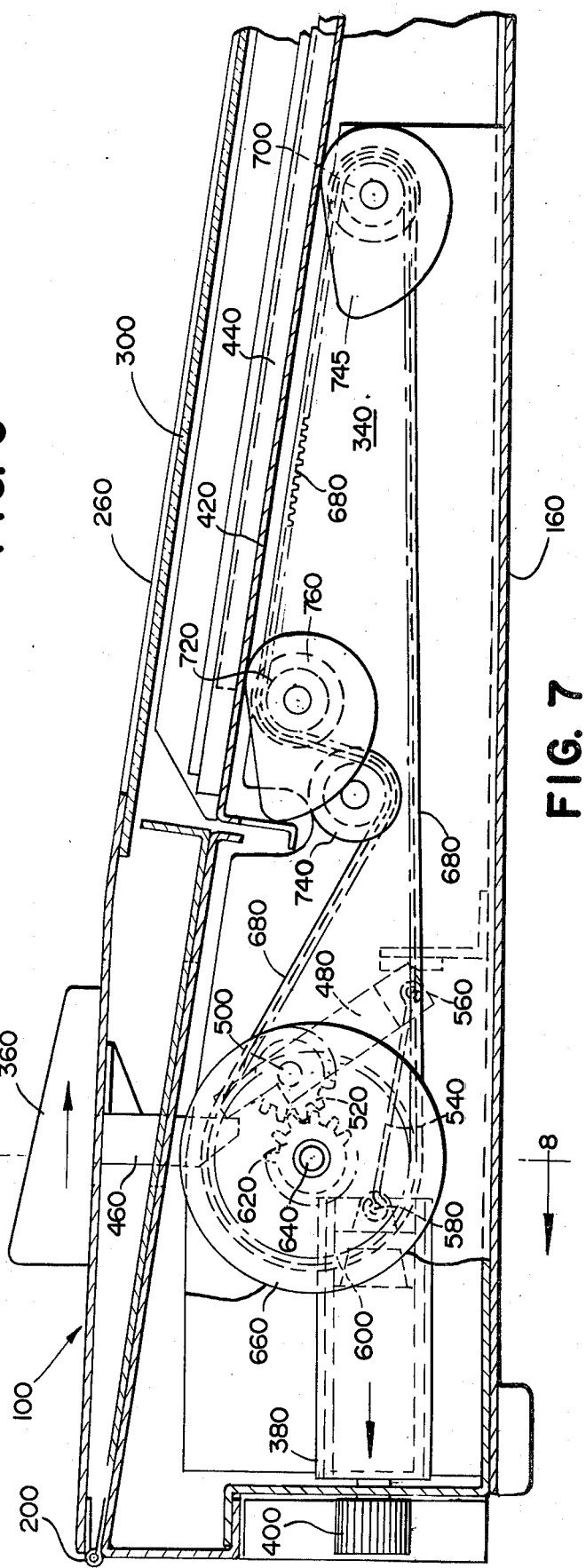

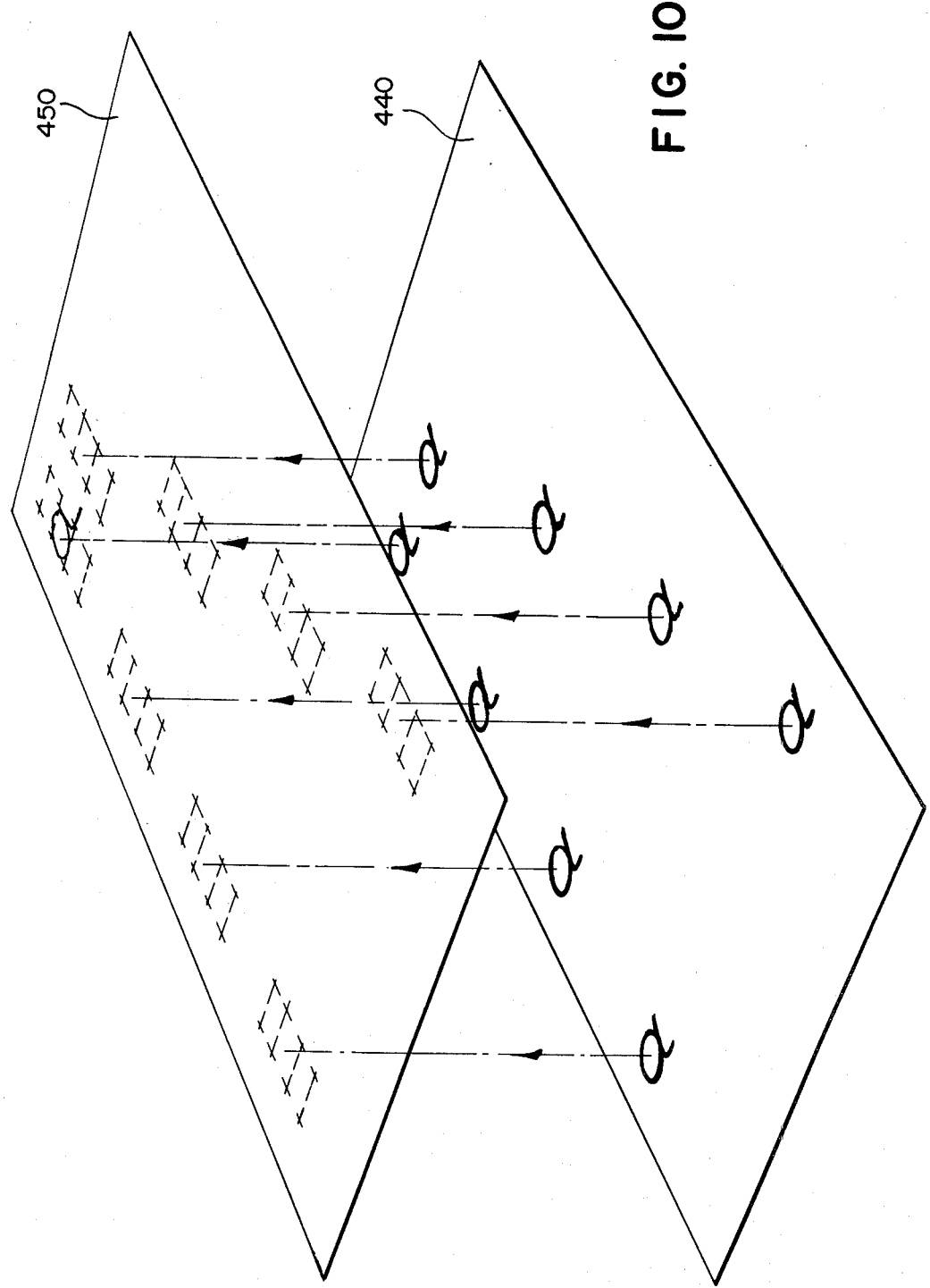

TEACHING METHOD AND APPARATUS

BACKGROUND OF THE INVENTION

This is a continuation-in-part of copending application Ser. No. 658,374, filed Feb. 17, 1976, and now abandoned.

This invention is directed to novel educational methods and apparatus. Since it is particularly directed to perceptual learning problems such as dyslexia, the invention will be best understood by a short reference thereto.

Dyslexia, previously designated as word-symbol blindness, is generally manifested by reversals or strephosymbolia. By way of illustration, a dyslexic might have trouble distinguishing between a "b" and a "d" or a "p" and a "q". Common manifestations of dyslexia as a reading disability occur in a difficulty or inability to distinguish between words such as "was" and "saw" or "boys" and "dogs". A dyslexic might write "and" as "dna"; "with" as "whte" or "its" as "ist". Some educational psychologists regard dyslexia as a special variety of aphasia, that is, as an inability to handle and order symbolic or abstract material.

Dyslexia is generally easily detected through an individual's perceptual-motor activities. It may, for example, be observed in any or all of the following: poor ability to reproduce rhythm in sequence; cramped, slowly done or very messy handwriting; frequent miscopying a word in one place while copying it correctly in another; making letter and number formations from down to up or from right to left, starting at the wrong place, but perhaps ending with the correct symbol; persistently and habitually reversing some of his letters and/or numbers, e.g., as illustrated above; poor motor coordination, either in using play equipment or in manipulating smaller objects in the classroom or at home; holding his pencil in a clumsy way when writing, etc. It may also be readily discernible through observations of one's perceptual abilities and orientation or his speech or language behavior.

The precise cause of dyslexia is not known for certain. It would seem that somehow or other there are some slight abnormalities in the way in which the brain has developed or is functioning. However, exactly what brain mechanisms are involved has not been established unequivocally. In any event, for purposes of understanding this patent application, a further and profound dissertation on dyslexia, its various manifestations in speech, reading, drawing, writing, etc. as well as the many adverse psychological effects, is not necessary. It is sufficient to say that dyslexia is a very real problem to a large number of people to some extent and only relatively recently has significant attention been given to the recognition that the dyslexic can be helped.

One known method of training or educating a dyslexic is by working to improve his perceptual-motor activities and his perceptual abilities and orientation. In fact, it may be considered that perceptual powers need be strengthened through sufficient exercises in all areas before one might proceed to higher stages of learning.

One known useful form of exercise for improving perceptual abilities, e.g., visual-motor coordination, figure-ground perception, perceptual constancy, etc. is tracing. Thus, for example, various exercises are known in the art whereby the dyslectic child is supplied with various lesson materials in which he is asked to make tracings in one or more colors. For instance, one recognized method, referred to as the "Orton-Gillingham Method", requires the pupil to sound out and trace the visually printed word. One aspect of another method for teaching reading, the so-called Montessori Method, involves tactile tracing of letters until writing is spontaneous. Other exercises employing tracings to correct and overcome difficulties observed in freehand copying of stimulus design are also known.

SUMMARY OF THE INVENTION

The present invention is predicated upon the recognition that the clinical and instructional benefits derived from tracing, whether by a dyslexic or other possessing a reading disability as well as in the various educational exercises for those not suffering from such problems can be materially enhanced if the motor function is not entirely tracing but is instead a combination of tracing and recall or memory. Stated simply, it has been found that a valuable exercise of the foregoing description requires the pupil to commence by tracing and with the stimulus non-observable to complete from memory. The tracing brings into play the motor function, while the perceptual stimuli are transmitted to the brain, "stored" there for a brief interval, and then recalled for the motor stimuli to complete this tracing.

The present invention is thus directed to a novel method and apparatus for accomplishing the foregoing objectives.

BRIEF DESCRIPTION OF DRAWING

FIG. 6 is a sectional view of the device of FIG. 5 in one phase of its operation;

FIG. 7 is a somewhat more detailed sectional view of the device of FIG. 5 in another phase of its operation;

FIG. 10 is a perspective view showing the superposed relationship of copy paper to lesson material as used in one teaching procedure contemplated by this invention.

DETAILED DESCRIPTION OF THE INVENTION

The present invention contemplates a novel instructional or educational system whereby lesson material is rendered visible to the pupil for a predetermined brief interval and then caused to become invisible or non-discernible. As was heretofore mentioned, it is particularly directed to those systems wherein the pupil is asked to initiate tracing of the lesson material and to complete his drawing by memory. However, as will appear hereinafter, the invention need not be restricted to systems involving tracings, but may be employed as an educational system wherein the pupil attempts to reconstruct the lesson material in his mind from memory or recall of what he has just observed; or to compare what he has just marked on his copy paper with what he should have marked or produced.

The invention will be more readily understood by reference to the illustrative drawings.

Figure 1:
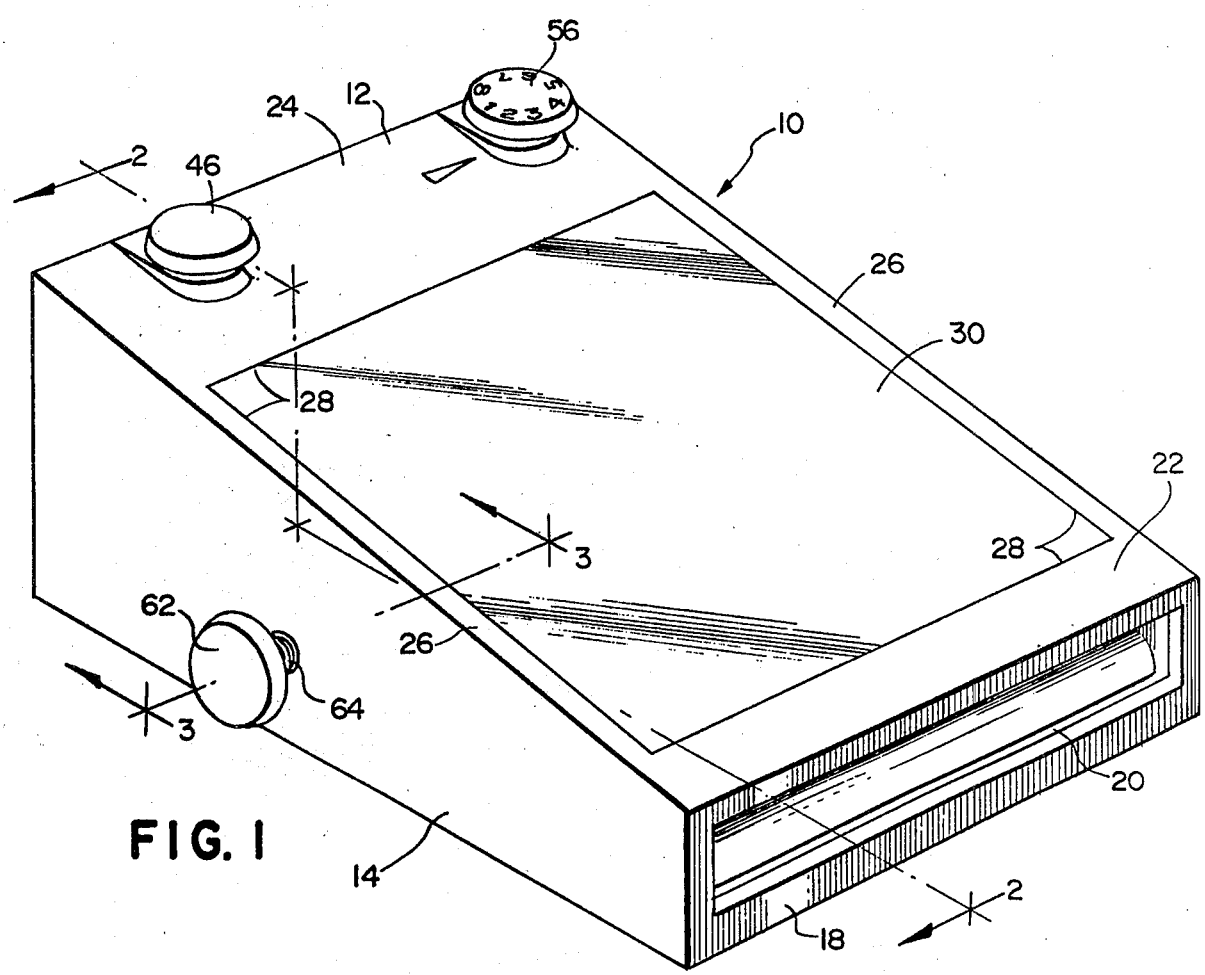
FIG. 1 is a perspective view of an illustrative teaching device of this invention.
Figure 2:
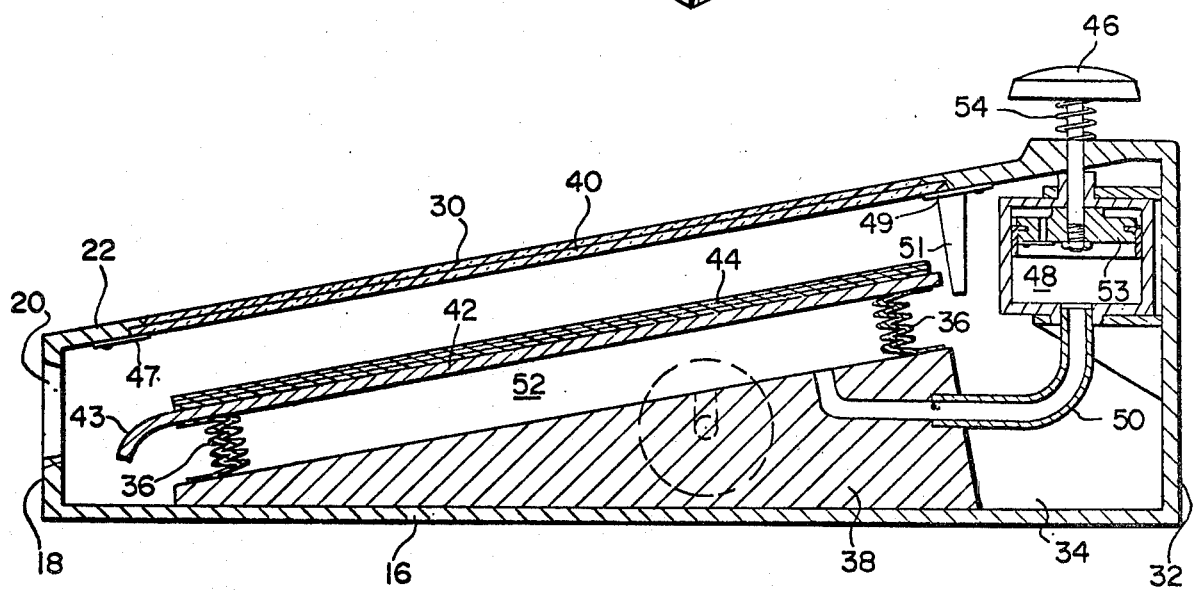
FIG. 2 is a sectional view taken along lines 2—2 of the device of FIG. 1 in one phase of its operation.
Figure 3:
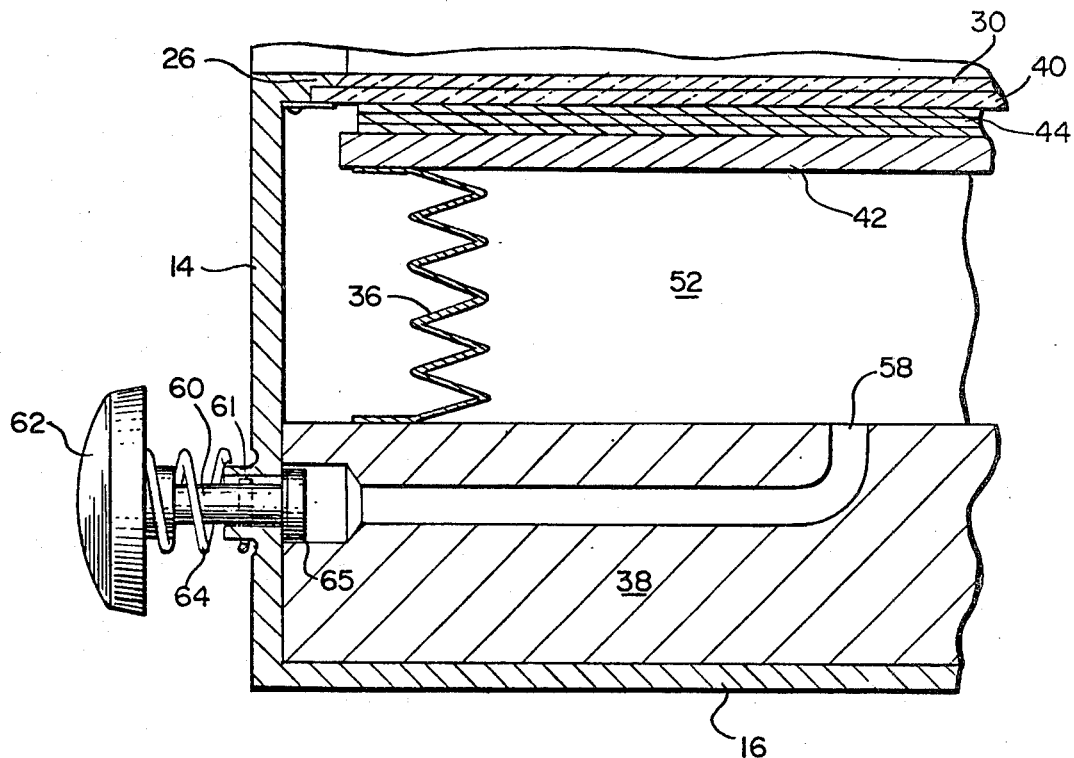
FIG. 3 is a sectional view taken along lines 3—3 showing the device of FIG. 1 in a second phase of its operation.

In the embodiment shown in FIGS. 1-3, teaching device 10 is shown to have a top 12, sides 14, bottom 16, a front panel 18, and a rear panel 32 defining a chamber 34 into which lesson material may be inserted through an opening 20 in front panel 18.

While not necessary, device 10 is illustrated to be of a generally prismatic configuration with front panel 18 shorter than rear panel 32 to provide a slanted top surface for more comfortable viewing and/or tracing.

Top 12 is shown to have a front portion 22, a rear portion 24 and side portions 26 defining an opening 28 into which is secured in any desired manner a transparent dimensionally stable sheet material 30 of glass or plastic, providing a viewing surface as well as a surface for positioning tracing paper (not shown). Sheet 30 is preferably positioned with its outer surface flush with the outer or top surface of top frame 12 so as to provide a smooth writing surface. A sheet of translucent material 40 (FIG. 2) may be mounted within chamber 34 contiguous with the inner surface of sheet material 30. Sheet material 40 may, for example, comprise a suitable transparent plastic having a pigment or dye dispersed therein of the type per se well known, e.g., a polyester such as polyethylene terephthalate having titanium dioxide dispersed therein to provide the desired translucency. Sheets 30 and 40 may, for example, be laminated together if desired. Translucent sheet material 40 should be at least the same dimensions as sheet 30 and may, as shown in the drawings, be slightly larger. If desired, sheet 40 may be eliminated altogether and sheet 30 made translucent, either by distributing a white pigment such as titanium dioxide through at least a portion of its thickness or by applying a layer or coating of such a material on the inner surface thereof to provide the desired degree of translucency, as will be apparent hereinafter. Alternatively, the translucency needed for the practice of this invention (which will be described in detail hereinafter) may be provided by the copy paper itself, thereby eliminating sheet 40.

As will be appreciated, sheets 30 and 40 may be mounted or secured on device 10 in any desired manner. With reference to FIG. 2, they may be retained by front and rear plates 47 and 49 respectively riveted or otherwise secured to the inner surface of top 12. If desired, they may be retained by providing top 12 with a retaining flange or lip, as shown, for example, in the alternate illustrative embodiment of FIG. 4, to be described hereinafter.

Within chamber 34 defined by the wall members, as described above, a bellows 36 is mounted on block or base 38, as shown in FIGS. 2 and 3. Bellows 36 has a generally flat top plate 42 adapted to receive and act as a base or support member for lesson material or the like 44 transmitted within opening 20 when bellows 36 is in its collapsed or "down" position. Top plate 42 is shown to be curved downwardly at its leading (front) end 43 to facilitate loading of the lesson material on the top plate, while rear mounting plate 49 is shown to have teeth 51 projecting downwardly as rear guide means for positioning the lesson material properly within chamber 34.

An air pump of per se known design is provided to raise and lower bellows 36. This air pump includes a piston 53 having an actuating plunger 46 (FIGS. 1 and 2) which when depressed or lowered one or more times will force air from chamber 48 via conduit 50 into bellows chamber 52, causing it to expand and thereby placing plate 42 and lesson material 44 in juxtaposition with the translucent sheet material 40. In this position, the lesson material will be viewable through sheet materials 30 and 40.

In per se known manner, plunger 46 is provided with a helical spring 54, causing the plunger 46 to return after a short interval to its initial "up" position. By depressing the plunger one or more times, as needed, the bellows is thus pumped up, permitting the lesson material to be viewed.

While air escape means in the form of a valve or the like may obviously be provided to permit air to escape automatically from the bellows chamber, thereby causing it to collapse automatically to a lower position where the lesson material is no longer visible after a predetermined short interval, in the embodiment illustrated in FIGS. 1-3, the lowering of the bellows is accomplished manually to a degree by the student or teacher.

With reference to FIG. 3, the air escape means is shown to be a valve manually actuated by depressing plunger 62 and thus tubular piston-like rod 60 seated in side wall 14. An air conduit 58 is mounted in base 38 and leads to within bellows chamber 52. Rod 60 has a diameter slightly smaller than the opening in sidewall 14 in which it is seated, so that when it is depressed, air can escape through conduit 58 to the outside, permitting the bellows to collapse to a lower position where the lesson material is no longer visible. A helical compression spring 64 is provided to maintain rod plunger 62 in a normally extended position. When thus extended, as shown in FIG. 3, disc 65, which is secured to piston 60 and has a diameter larger than the opening in wall 14 in which the piston is seated, seals this opening and efficiently prevents air escape, thereby preventing collapse of the bellows.

While the valve means described above can obviously function entirely manually by retaining plunger 62 depressed until sufficient air is released to cause collapse of the bellows the necessary distance, an automatic feature is provided by means of locking pin 61 on rod 60. When rod 60 is depressed a sufficient distance for pin 61 to clear the side wall and be within chamber 34, plunger 62 is rotated, e.g., in the direction of the "arrow" (FIG. 1) to lock rod 60 and disc 65 in the "open" position, so that one does not have to keep his hand on plunger 62. In this manner, air will leak slowly and automatically from the bellows. It will be appreciated, of course, that the valve will be so constructed that a predetermined period of time, whether one minute or several minutes, as desired, will elapse before sufficient air has been removed to cause the bellows to collapse enough for the lesson material to be invisible. Thereafter, the valve is closed simply by rotating the plunger in the opposite direction to release the locking pin.

While various valve constructions are possible and hence within the scope of this invention, it will be seen that the air release means shown for purposes of illustration combines the advantages of manual and automatic functions. Thus, unlike a fully automatic valve system, nothing happens until plunger 62 is depressed. This permits the lesson material to be observed indefinitely until its disappearance is desired. (In some exercises, disappearances may not be desired at all.) Disappearance is accomplished by depressing the valve plunger and then, if desired, rotating it so that the air release is then automatic.

From the foregoing discussion, it will be appreciated that the degree of translucency provided, e.g. by sheet material 40, should be such that the lesson material is easily visible when in juxtaposition but not visible (or at least not recognizable) when it is removed from juxtaposition, i.e., when bellows 36 is collapsed. Thus, it can be said that the visibility or lack thereof of the lesson material is a function of the degree of transparency to visible light of the translucent member and the distance between it and the lesson material. It follows, therefore, that the bellows should be sufficient to move the lesson material far enough away from the viewing surface so that it cannot be seen. The precise parameters are well within the skill of those in the art and per se comprise no critical part of this invention. However, generally speaking, movement of less than an inch has been found to be sufficient.

While a bellows and air pump have been shown for purposes of illustration as the means for moving the lesson material up and down with respect to the viewing surface of sheet material 30, it will be appreciated that the invention is not limited thereto and the selection of other equivalent means will be apparent. By way of illustration, such means could comprise a mechanical timer which after a predetermined desired time interval would retract the lesson material from view, an electrical timing circuit to actuate lesson withdrawal, e.g., by pneumatic raising or lowering means, a bimetallic element which may be heated and upon cooling causes withdrawal of the lesson material, etc. Obviously, more sophisticated means may be envisioned.

If desired, a light source (not shown) may be included within chamber 34 if found desirable to enhance viewing.

While not necessary, a counter 56 consisting essentially of a numbered dial is shown to be provided for manual operation by the pupil or the instructor. Dial 56 is intended to record the number of times, 1, 2, 3, or whatever, required to elevate the bellows in order to complete the lesson. This helps provide a guideline to the proficiency of the pupil. Obviously, the fewer times and hence the lower number on dial 56, the more proficient the pupil, assuming, of course, a constant in terms of quality of work.

In operation, and assuming tracing is the lesson contemplated, dial 56 is set at "1", the lesson material is inserted through opening 20 and a sheet of tracing paper is placed on surface 30. Plunger 46 is then activated, causing the lesson material to appear in view. The pupil would then place his tracing paper on surface 30 and when ready would then typically depress and rotate plunger 62 to actuate the air release system. The pupil then commences tracing until the lesson material disappears from view, which may be a matter of seconds or even minutes, as desired. If need be the operation is repeated one or more times until the lesson is completed. In the embodiment actually illustrated in FIGS. 1-3, this withdrawal of the lesson material is actually initiated by depressing plunger 62 and retaining it in the depressed position for the time interval necessary to permit enough air to escape to lower the bellows a sufficient distance. Of course, as mentioned above, the valve means may be automatic to eliminate the need for manually initiating the air release valve, e.g., by depressing plunger 62. Suitable other valve means will be readily apparent to those skilled in the art.

It will be seen from the foregoing description that the essence of the teaching system of this invention is to provide means for rendering lesson material to be observed and/or traced visible for a predetermined period of time and then rendering it non-discernible or invisible so that the lesson must be completed by recall. This operation is repeated as many times as needed to complete the lesson and a counter may be provided to record the number of times it need be repeated.

Figure 4:
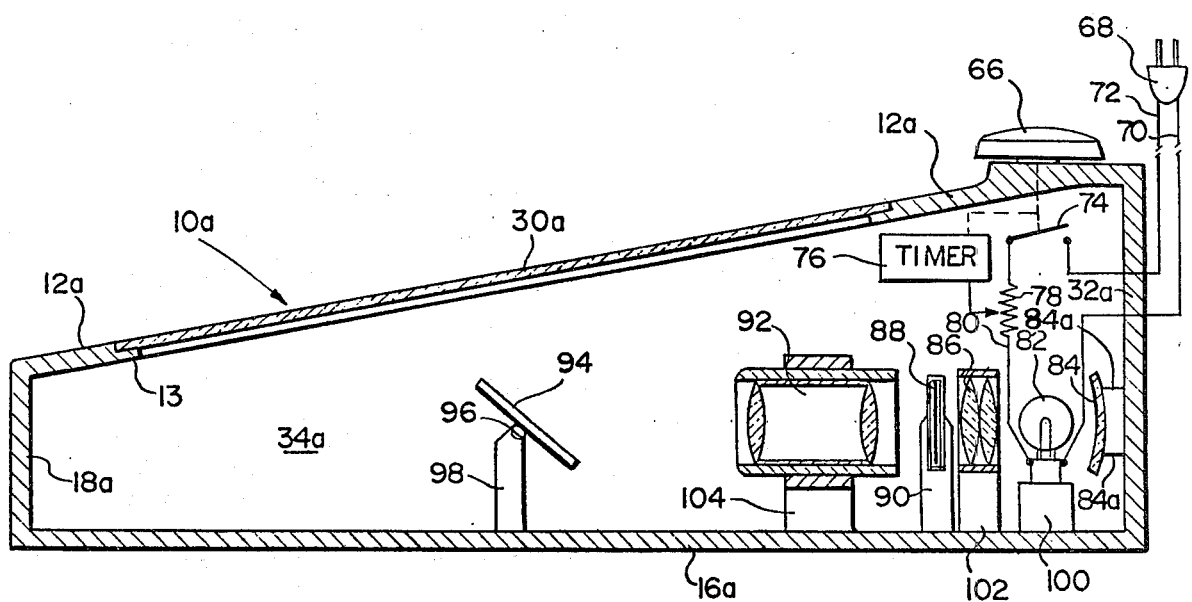
FIG. 4 is a sectional view of an alternative embodiment of this invention.
Figure 5:
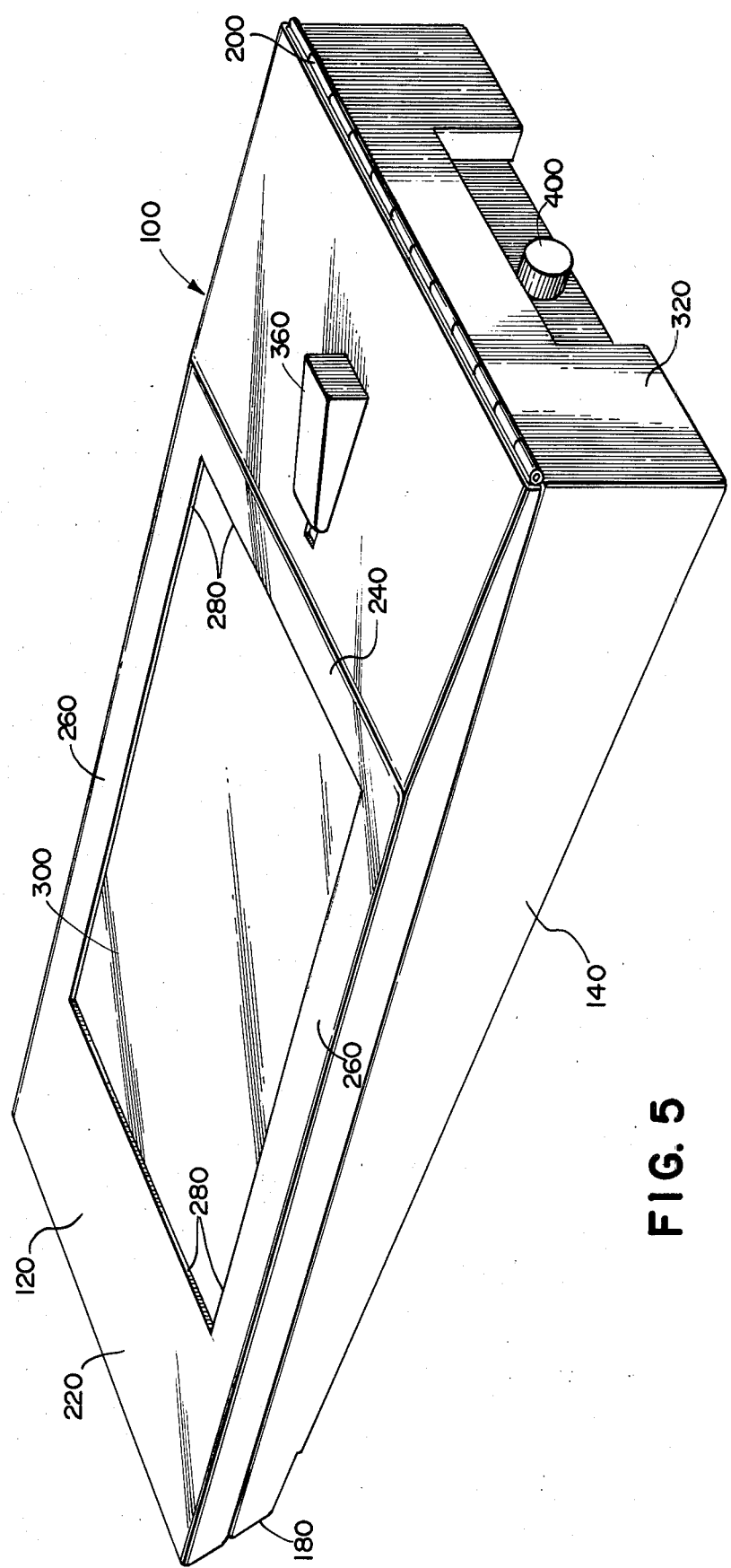
FIG. 5 is a perspective view of a particularly preferred teaching device of this invention.

Another means for accomplishing this objective is shown in FIG. 4.

As shown therein, teaching device 10a has top, bottom, end, and side walls of the general configuration of device 10 shown in FIGS. 1-3. A sheet material 30a, which may be transparent or translucent, is shown to be seated on lip 13 of top 12a to provide the viewing and writing surface. Front panel 18a, rear panel 32a, bottom 16a, and the side panels (not shown in this sectional view) form a chamber 34a to which access may be obtained by either providing a door in one or both side panels or by making one or both side panels removable.

Within chamber 34a a slide projecting system of generally known type is provided. This system is actuated by plug 68 having leads 70 and 72 adapted for use with a standard electrical current.

Switch 74 actuated manually by knob 66 completes the circuit in known manner when closed. Timer 76, which may be electrically operated by circuitry not shown but which may be conventional, controls rheostat or resistor 78 connected by lead 80 to light source 82 mounted on base 100 secured to bottom wall 16a. Reflecting mirror 84 mounted on plates 84a to rear panel 32a facilitates transmission of light from source 82 through a suitable lens system of known type 86 mounted on base 102 to bottom wall 16a, through slides 88 on slide mount 90, and lens 92 on base 104 secured to bottom wall 16a, to reflecting mirror 94, e.g., a fresnel mirror of known type, secured at 96 to base 98 at an angle of approximately 45° to the incident light from the projecting system, causing the resulting image on slides 88 to be projected upwardly to be viewable through sheet 30a.

As was mentioned previously, sheet 30a may be transparent or translucent. It must in any event be of sufficient transparency to permit clear viewing of the projected image and accordingly may be substantially transparent. However, it preferably possesses some degree of opacity, i.e. is somewhat translucent, so as to mask the projecting system and thus obviate any distraction caused by so viewing it along with the projected image.

Timer 76 controls rheostat 78 so that after a predetermined prescribed time light source 82 will be dimmed to a point where the image is no longer projected, thereby compelling the student to complete the lesson by recall. It will be appreciated that the timer may be variably set at the prescribed time interval by suitable external controls (not shown).

In operation, the projecting system will be loaded and copy paper placed on the surface of sheet 30a. The current will then be turned on, e.g., by actuating a switch (not shown). It will be appreciated that if timer 76 is regulated by external controls, it will be set at the time interval when it is desired that the lesson material "disappear". The student then commences his tracing lesson, completing from memory, as described previously. As in device 10, a counter is preferably provided to record the number of repeats required to complete the lesson.

FIGS. 5-9 illustrate a particularly preferred teaching device of this invention. As shown therein device 100 has a top 120, sides 140, bottom 160, front 180 and rear panel 320 defining a chamber 340 for housing the lesson material. Top panel 120, which is hinged 200 at the rear for access to chamber 340, has a front portion 220, a rear portion 240, and side portions 260 defining an opening 280 in the top panel. A transparent sheet 300 covers opening 280 and provides a writing surface, as heretofore described.

A slideable member 360 extending through the top panel actuates the mechanism for moving the lesson material between the upper and lower positions. Slideable member 360 has a detent in the form of a depending arm 460 engaging two-armed lever 480 welded or otherwise secured to shaft 500 of gear 520. A rod 540 is secured at one end 560 to lever 480, and at the other end 580 to piston 600 of air dash pot 380 of known type or configuration and which is provided with valve means, e.g., a screw 400 for controlling the rate of air intake. With reference to FIG. 7, when slideable member 360 is pushed frontward (to the right in the direction of the arrow as shown in FIG. 7, piston 600 moves rearward (as shown by the arrow).

Gear 520 engages another gear 620 secured to the shaft 640 of pulley wheel 660. An endless belt 680, preferably a toothed or cogged timing belt to prevent slippage, extends around pulley wheels 660, 700, 720 and 740. Wheel 700 is secured at its shaft to cam 745; and wheel 720 is likewise secured to cam 760. Cams 745 and 760 (FIG. 7) move counterclockwise to raise support plate 420 with lesson material 440 to its upper (visible) position, as shown in FIG. 6.

Figure 9:
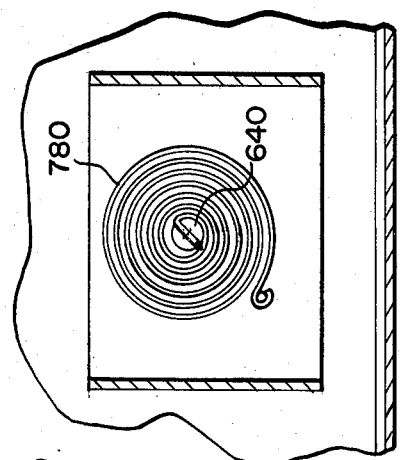
FIG. 9 is a sectional view taken along lines 9—9 (FIG. 8)
Figure 8:
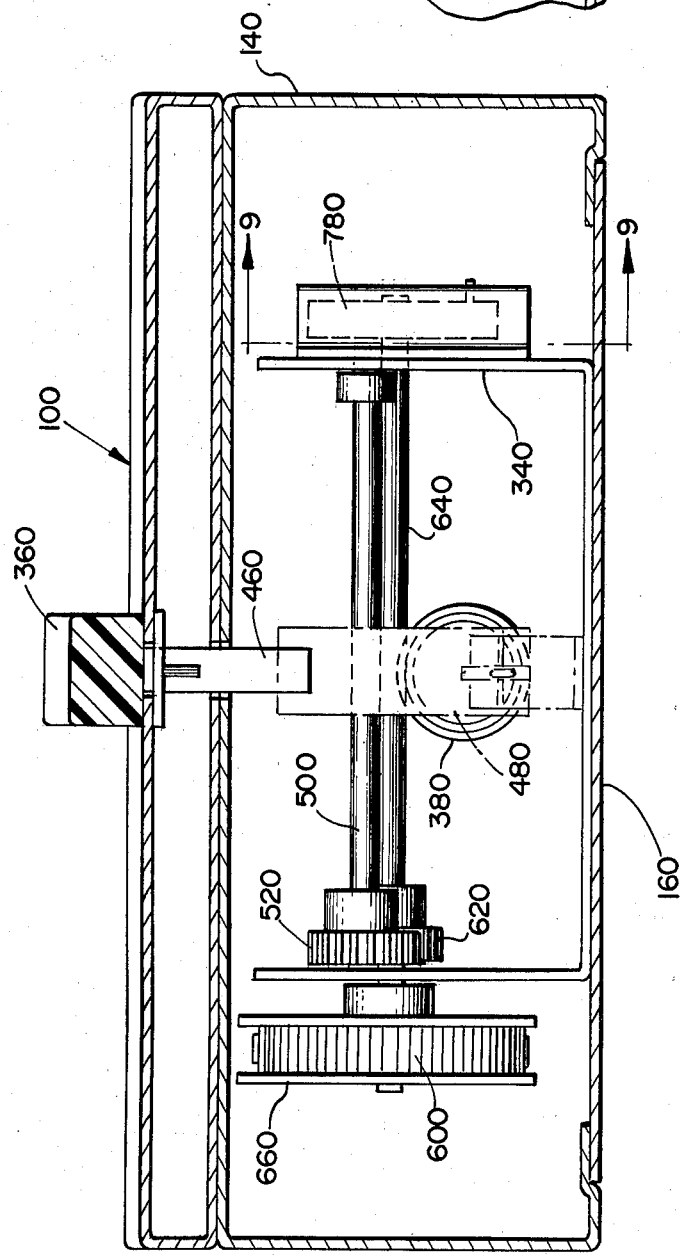
FIG. 8 is a sectional view taken along lines 8—8 (FIG. 7)

As shown in FIGS. 8-9, a spring motor 780 of known configuration on shaft 640 cooperates with the valve or airintake means to cause piston 600 to move in reverse, i.e., frontward, to lower the cams and thereby lower the lesson material.

Device 100 has been shown to contain a transparent writing surface 300. The desired translucency may be provided by at least three alternative procedures. First, a sheet of translucent material may be laminated to sheet 300, as is mentioned in the description of the previous embodiments. Secondly, a sheet of translucent material, e.g., paper or plastic, may be manually placed between the lesson material and the transparent sheet 300 when loading the device for usage. Third, the desired translucency may be provided by the copy paper itself. For maximum flexibility, it is preferred that the device itself has a completely transparent surface. In this manner, if heavier or more translucent copy paper happens to be used, there is no problem of complete visibility when desired, which might be the case if the lesson material is not particularly distinct and a translucent sheet is also provided in association with the transparent sheet. If the copy paper is not sufficiently translucent, it is a simple enough matter to insert a sheet of translucent material, as heretofore mentioned. In any event, it is within the scope of this invention to provide the desired translucency according to the practitioner's particular needs or simply his mere whim.

In view of the foregoing description, the operation of the device of FIGS. 5-9 should be readily apparent. Top panel 120 is raised and the lesson material (along with a translucent sheet, if needed) is inserted. Screw 400 is adjusted to the desired time interval and slideable member 360 is moved frontward to render the lesson material visible. After the predetermined time interval, the lesson material automatically returns to its lower non-visible position.

It will be appreciated that throughout the specification and claims, "non-visible" is used in a relative sense. It may still be sufficiently "visible" so that one will see or recognize that something is there. However, it is still "non-visible" in the sense that it is not discernible or recognizable.

The particular materials employed in the construction of the teaching device of this invention are not critical and the walls may, for example, be made of wood, metal, or plastic. However, for reasons which will be apparent, lightweight plastics of the requisite strength and rigidity are preferred.

As will be apparent from the foregoing description, the present invention provides a novel teaching method and an apparatus for performing it.

The invention brings the elements of perceptual stimulation and recall or memory into the motor function, thereby materially aiding and reinforcing the instructional procedures directed to improving motor and/or motor-perceptual responses of the individual in a unique manner.

While various teaching procedures will be readily apparent to the teacher, psychologist or others skilled in the art in the light of the foregoing description, the invention is particularly directed and hence is particularly suitable for teaching and/or therapy with those suffering from various neurological, muscular, reading, or other perceptual problems or abnormalities. As was mentioned, dyslexics are primary examples of the individuals particularly contemplated by this invention. By bringing the memory function into the lesson procedures, improvements are obtainable in motor-perceptual functions appreciably beyond that obtainable with the tracing procedures alone which have heretofore been employed.

The present invention also contemplates various educational procedures other than the one recited in the preceding description within subject matter is reproduced in part by tracing and in part from recall or memory. Actually this is but the initial or basic step in the learning process for dyslexics or others to which this invention is directed. The subject will advance fairly rapidly to more advanced procedures such as the one described hereinafter with reference to FIG. 10.

To use this procedure, copy paper is employed with register marks indicating the space where the subject is to produce the lesson material. These register marks correspond with the printed matter on the lesson material so that when they are superposed in the teaching device of this invention and the lesson material is brought to the "visible" position, the lesson material will appear beneath the register marks.

To illustrate this procedure, reference is now made for purposes of illustration of FIG. 10 wherein lesson material having a series of the small letter "a" is inserted in the teaching device. A small letter "a" is then produced on the copy paper 450 in one of the register "boxes" in any manner desired. It may be printed on the copy paper in advance, or it may be produced thereon by the instructor or by the subject in any manner. The object is for the subject to reproduce this letter by perception (not tracing or recall) in one or more of the remaining boxes, say, for example, the next adjacent box. The subject tries to do so by perception or visualization of the letter initially provided in the first box. After he has done so, he activates the device to bring the lesson material 440 into juxtaposition with the copy paper so that the letter which should have been reproduced in proper form is visible beneath that which the subject has just produced. In this manner, the subject can compare what he has just done with what he should have done. He can then continue with the lesson with the remaining boxes and in this manner learns to reproduce correctly from memory or perception.

The same basic principle may be utilized to teach phonics. For instance, in certain learning disabilities, the subject has trouble with such things as distinguishing the sound of a "t" from that of a "d". In one basic lesson, the copy paper may be provided with such letters as "m-a-", "c-a-" and the like, with a space or box to supply one or more additional letters. He may be asked orally (since this is a phonics lesson) to spell "mat", "cat", etc., in which event he must supply a "t" to complete the word. After he has supplied the letter he thinks is missing, he then activates the device in the now familiar manner to bring the correct letter into sight beneath what he has written. In this manner, he can observe whether he has provided the correct sound, and, if so, if he has printed the missing letter(s) properly.

The present invention provides certain phychological and emotional advantages to the learning process which contribute greatly to the general disposition and receptivity of the subject. These advantages are so significant they cannot be overemphasized.

A person with learning disability, such as a dyslexic, frequently suffers great anxiety, frustration, anger, resentment, impatience, hostility, and other such emotions which not only impair his learning capabilities, but also his general character and temperament. He is different from "normal" people, knows it, doesn't like it, but can't do anything about it.

The present invention permits him to work at his own pace, with minimal supervision, and to correct himself until he has successfully completed his lesson material. Frustration and anger disappear when the subject realizes he can cause the lesson material to reappear as often as he needs it. This, of course, will vary from subject to subject and the present invention provides this needed flexibility. Successful completion in turn brings on satisfaction and success in accomplishment, emotions often totally lacking previously, thereby greatly increasing the enthusiasm and receptivity of the subject for subsequent lessons.

From the foregoing description it will be appreciated that the present invention provides a much needed tool which allows one to bring stimuli under control in a wide range of learning situations. To our knowledge, no other tool is available which allows one to train a child's perceptual skill, while also varying the intensity of the stimulus and the length of stimulus presentation time. These unique factors are also accessible for the child to control himself, giving him the opportunity to become the determiner of his own learning rate.

Since certain changes may be made in the above process and apparatus without departing from the scope of the invention herein involved, it is intended that all matter contained in the above description shall be interpreted as illustrative and not in a limiting sense.

I claim:

1. A method for improving motor-perceptual learning of an individual comprising the steps of:
   (1) providing lesson material to be reproduced;
   (2) rendering said lesson material visible and thereby traceable for an initial predetermined period of time;
   (3) commencing said reproduction of said lesson material by tracing a portion thereof;
   (4) rendering said lesson material non-visible at the end of said predetermined period of time and before said reproduction can be completed by tracing;
   (5) reproducing from memory all or at least a further portion of the remaining subject matter not reproduced by tracing; and
   (6) if said reproduction is not completed, repeating said steps 2 to 5 of rendering said lesson material visible, tracing, rendering said lesson material non-visible and reproducing from memory until said lesson material has been reproduced.

2. A method as defined in claim 1 including the steps of providing an element having a writing surface upon which to trace said lesson material; positioning said lesson material on the side of said element opposed from said writing surface where it is initially visible and, therefore, traceable for said predetermined period of time; and thereafter rendering it invisible and thereby non-traceable without removing it from the opposed side of said element.

3. A teaching method involving the reproduction of lesson material, said method comprising the steps of:
   (1) providing a transparent or translucent writing surface through which said lesson material on the opposed side is visible at a first distance from said surface and invisible from a second greater distance therefrom, said second distance being vertically spaced from said first distance;
   (2) positioning said lesson material at said first distance where it is visible and thereby traceable for a predetermined period of time wherein tracing of said lesson material upon said writing surface can be commenced, but not completed; and
   (3) moving said lesson material vertically to said second position further from said writing surface at the end of said predetermined period of time and before said tracing of said lesson material can be completed at the end of said predetermined period of time.

4. A method as defined in claim 3 including the additional step of reproducing at least a further portion of said lesson material from memory.

5. A method as defined in claim 3 wherein said writing surface is translucent.

6. A method as defined in claim 5 wherein said translucent writing surface comprises a first transparent sheet material and a second translucent sheet material.

7. A method as defined in claim 3 wherein said writing surface is transparent and including the step of employing a translucent copy paper upon which to reproduce said lesson material.

8. A teaching method comprising the steps of:
   (1) providing a transparent or translucent writing surface;
   (2) placing a sheet of copy paper on one side of said surface and lesson material on the opposed side thereof, said copy paper having at least one defined area for producing said lesson, said lesson material being placed in registration wherein it is visible through said copy paper within said area when said lesson material is at a first distance close to said writing surface and is invisible through said copy paper at a second greater distance vertically spaced therefrom;

(3) positioning said lesson material at said second distance where it is not visible;

(4) attempting to produce said lesson material on said copy paper by memory or by perception;

(5) moving said lesson material to said first position where it is visible through said area of said copy paper where it was attempted to be produced; and (6) comparing said attempted production with what should have been produced on said lesson material in registration and visible beneath said copy paper.

9. A method as defined in claim 8 including the further step of correcting said attempted production by tracing said correct lesson material positioned at said first distance where it is traceable.

10. A teaching apparatus comprising top and side wall members defining a chamber within which to insert lesson material to be reproduced, said top member being generally planar and having a transparent or translucent area of at least equal dimensions to said lesson material upon which to place copy paper for producing said lesson material; means for positioning said lesson material within said chamber at a first distance close to said top member where it is visible through said copy paper; means for positioning said lesson material within said chamber at a second and lower distance where it is not visible through said copy paper; and means for moving said lesson material vertically between said first and second distances.

11. Apparatus as defined in claim 10 including means for automatically moving said lesson material to said second distance after a predetermined period of time from when it was positioned at said first distance.

12. Apparatus as defined in claim 10 wherein said means for positioning said lesson material within said chamber comprises a generally planar support member for said lesson material, said support member being movable in a plane substantially parallel to said top member to said first and second distances.

13. Apparatus as defined in claim 11 wherein said means for automatically moving said lesson material includes air valve means.

14. Apparatus as defined in claim 13 wherein said air valve means comprises an air dash pot.

15. A teaching apparatus comprising top and side members defining a chamber within which to insert lesson material, at least a portion of said top member being transparent or translucent to provide a surface for writing and through which lesson material within said chamber can be viewed through copy paper positioned on said portion of said top member;

bellows means having a top plate for supporting lesson material insertable thereon through an opening in one of said side members; said bellows means being movable in a plane substantially parallel to said top member;

means for forcing air within said bellows means causing it to expand to a first position rear said top member where lesson material on said top plate is visible through said copy paper on said top member; and means for releasing air from said bellows means to cause it to collapse, thereby moving said top plate to a second position further from said top member where lesson material on said top plate is no longer visible through said copy paper.

16. A teaching apparatus comprising top and side members defining a chamber within which to insert lesson material, at least a portion of said top member being transparent or translucent to provide a surface for writing and through which lesson material within said chamber can be viewed through copy paper positioned on said portion of said top member; means for inserting said lesson material within said chamber on a support plate movable in a plane substantially parallel to said top member between a first upper position close to said top member where said lesson material on said support plate is visible through said copy paper on said top member and a second lower position where said lesson material is no longer visible through said copy paper; cam means for moving said support plate to said first position; and means for moving said support plate from said first to said second position.

17. Apparatus as defined in claim 16 wherein said last-mentioned moving means comprises means for moving said support plate from said first to said second position automatically after a predetermined period of time.

18. Apparatus as defined in claim 16 including pulley means associated with said cam means and adapted for moving said cam means in a first direction to raise said support plate and in a reverse direction to lower said support plate; and drive means for rotating said pulley means to move said cam means in said first or reverse directions.

19. Apparatus as defined in claim 18 including air dash pot means for moving said drive means to lower said support plate.

* * * * *